United States Patent
Hahn et al.

(10) Patent No.: US 9,876,589 B2
(45) Date of Patent: Jan. 23, 2018

(54) METHOD FOR ADJUSTING INTER-CELL INTERFERENCE IN WIRELESS COMMUNICATION SYSTEM AND APPARATUS THEREFOR

(71) Applicant: LG ELECTRONICS INC., Seoul (KR)

(72) Inventors: Genebeck Hahn, Seoul (KR); Jaehoon Chung, Seoul (KR); Eunjong Lee, Seoul (KR); Jinmin Kim, Seoul (KR); Kukheon Choi, Seoul (KR); Kwangseok Noh, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/513,062

(22) PCT Filed: Jun. 2, 2015

(86) PCT No.: PCT/KR2015/005516
§ 371 (c)(1),
(2) Date: Mar. 21, 2017

(87) PCT Pub. No.: WO2016/060353
PCT Pub. Date: Apr. 21, 2016

(65) Prior Publication Data
US 2017/0294976 A1    Oct. 12, 2017

Related U.S. Application Data

(60) Provisional application No. 62/063,966, filed on Oct. 15, 2014.

(51) Int. Cl.
*H04J 11/00* (2006.01)
*H04B 17/24* (2015.01)
(Continued)

(52) U.S. Cl.
CPC .......... *H04B 17/24* (2015.01); *H04B 17/345* (2015.01); *H04J 11/0026* (2013.01); *H04W 16/28* (2013.01); *H04W 24/10* (2013.01)

(58) Field of Classification Search
None
See application file for complete search history.

(56) References Cited

U.S. PATENT DOCUMENTS

2012/0106374 A1    5/2012    Gaal et al.
2013/0053076 A1*   2/2013    Chang .............. H04W 72/1215
                                                         455/509
(Continued)

FOREIGN PATENT DOCUMENTS

WO    WO 2014/122688 A1    8/2014

*Primary Examiner* — David Bilodeau
(74) *Attorney, Agent, or Firm* — Birch, Stewart, Kolasch & Birch, LLP

(57) ABSTRACT

According to one embodiment of the present invention, a method by which a fixed base station adjusts inter-cell interference in a wireless communication system comprises the steps of: receiving channel state information-reference signal (CSI-RS) configurations on an access link of each moving cell connected to the fixed base station; determining the CSI-RS configuration on a backhaul link of a first moving cell among the moving cells on the basis of the CSI-RS configurations on the access link; and providing, to the first moving cell, the CSI-RS configuration on the determined backhaul link, wherein the CSI-RS configuration on the determined backhaul link is for measuring, by the backhaul link of the first moving cell, the interference received from an access link of a second moving cell among the moving cells.

16 Claims, 13 Drawing Sheets

(51) Int. Cl.
*H04B 17/345* (2015.01)
*H04W 16/28* (2009.01)
*H04W 24/10* (2009.01)

(56) References Cited

U.S. PATENT DOCUMENTS

| | | |
|---|---|---|
| 2013/0053078 A1 | 2/2013 | Barbieri et al. |
| 2014/0099881 A1 | 4/2014 | Boudreau et al. |
| 2014/0233408 A1* | 8/2014 | Bontu ............... H04W 36/0094 370/252 |
| 2014/0301271 A1 | 10/2014 | Xu et al. |
| 2015/0045048 A1* | 2/2015 | Xu ........................ H04W 4/023 455/452.1 |
| 2015/0382371 A1* | 12/2015 | Liu ........................ H04B 7/024 370/329 |
| 2017/0237513 A1* | 8/2017 | Hahn .................... H04J 11/005 455/63.2 |

* cited by examiner

METHOD FOR ADJUSTING INTER-CELL INTERFERENCE IN WIRELESS COMMUNICATION SYSTEM AND APPARATUS THEREFOR

CROSS REFERENCE TO RELATED APPLICATIONS

This application is the National Phase of PCT International Application No. PCT/KR2015/005516, filed on Jun. 2, 2015, which claims priority under 35 U.S.C. 119(e) to U.S. Provisional Application No. 62/063,966, filed on Oct. 15, 2014, all of which are hereby expressly incorporated by reference into the present application.

TECHNICAL FIELD

The present invention relates to a wireless communication system, and more particularly, to a method for performing interference coordination between backhaul links and/or access links of moving cells connected to a fixed evolved node B (eNB) and apparatus therefor.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA).

Recently, a radio access network structure has been changed to a structure wherein various types of small cells, for example, pico cells or femto cells interact with a macro cell. As a cell structure is multilayered, a data transmission rate and QoE may be improved. In the 3GPP, indoor/outdoor scenarios based on low power nodes to improve small cells have been discussed. This discussion is disclosed in the 3GPP TR 36.932. Also, dual connectivity for a macro cell and the small cells has been discussed. As described above, in the future wireless communication environment, as many small cells are used, it is expected that a user equipment and cells will be located physically closer.

DISCLOSURE OF THE INVENTION

Technical Task

The technical task of the present invention is to provide a method for adjusting interference between moving cells and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In one aspect of the present invention, provided herein is a method for performing inter-cell interference coordination by a fixed evolved node B (eNB) in a wireless communication system, including: receiving channel state information-reference signal (CSI-RS) configurations on access links of individual moving cells connected to the fixed eNB; determining a CSI-RS configuration on a backhaul link of a first moving cell among the moving cells based on the CSI-RS configurations on the access links; and transmitting the determined CSI-RS configuration on the backhaul link to the first moving cell. In this case, the determined CSI-RS configuration on the backhaul link may be to measure interference caused to the backhaul link of the first moving cell by an access link of a second moving cell among the moving cells.

In another aspect of the present invention, provided herein is a fixed evolved node B (eNB) for performing inter-cell interference coordination in a wireless communication system, including: a receiver configured to receive channel state information-reference signal (CSI-RS) configurations on access links of individual moving cells connected to the fixed eNB; a processor configured to determine a CSI-RS configuration on a backhaul link of a first moving cell among the moving cells based on the CSI-RS configurations on the access links; and a transmitter configured to provide the first moving cell with the determined CSI-RS configuration on the backhaul link. In this case, the determined CSI-RS configuration on the backhaul link may be to measure interference caused to the backhaul link of the first moving cell by an access link of a second moving cell among the moving cells.

In a further aspect of the present invention, provided herein is a method for measuring interference from a second moving cell by a first moving cell connected to a fixed evolved node B (eNB) in a wireless communication system, including: transmitting, to the fixed eNB, a channel state information-reference signal (CSI-RS) configuration on an access link of the first moving cell; receiving, from the fixed eNB, a CSI-RS configuration on a backhaul link of the first moving cell; and measuring interference caused to the backhaul link of the first moving cell by an access link of the second moving cell based on the CSI-RS configuration on the backhaul link of the first moving cell. In this case, the CSI-RS configuration on the backhaul link of the first moving cell may be determined based on CSI-RS configurations on access links of a plurality of individual moving cells including the first and second moving cells.

Preferably, the CSI-RS configuration on the backhaul link may correspond to moving cell-specific information and the CSI-RS configurations on the access links may correspond to UE-specific information.

Preferably, the CSI-RS configuration on the backhaul link may be obtained by nulling a moving cell-specific CSI-RS, which is transmitted through the backhaul link of the first moving cell, in resource elements where a UE-specific CSI-RS is transmitted according to a CSI-RS configuration on the access link of the second moving cell.

Preferably, the fixed eNB may receive a channel state report including information on the interference caused to the backhaul link of the first moving cell by the access link of the second moving cell. More preferably, a transmission periodicity of the channel state report may be determined by considering at least one of mobility of the first moving cell and mobility of the second moving cell. More preferably, the information on the interference caused by the access link of the second moving cell may include information on a received power of a UE-specific CSI-RS, which is transmitted according to a CSI-RS configuration on the access link of the second moving cell, at the first moving cell and information on a reception timing of the UE-specific CSI-RS at the first moving cell.

Additionally, the fixed eNB may request scheduling information of the access link of the second moving cell according to the interference caused to the backhaul link of the first moving cell by the access link of the second moving cell, receive the scheduling information of the access link of the second moving cell, and perform interference coordination between the backhaul link of the first moving cell and the access link of the second moving cell based on the scheduling information of the access link of the second moving cell. More preferably, the fixed eNB may set at least one parameter in a subframe configuration of the backhaul link of the first moving cell to be different from that in a subframe configuration of the access link of the second moving cell. More preferably, the fixed eNB may set setting a beam direction for the backhaul link of the first moving cell to be different from that for the access link of the second moving cell.

Advantageous Effects

According to embodiments of the present invention, it is possible to efficiently cancel interference between moving cells even when a moving cell cannot obtain a physical cell identifier of another moving cell.

It will be appreciated by persons skilled in the art that the effects that can be achieved through the present invention are not limited to what has been particularly described hereinabove and other advantages of the present invention will be more clearly understood from the following detailed description.

MODE FOR INVENTION

Figure 1:
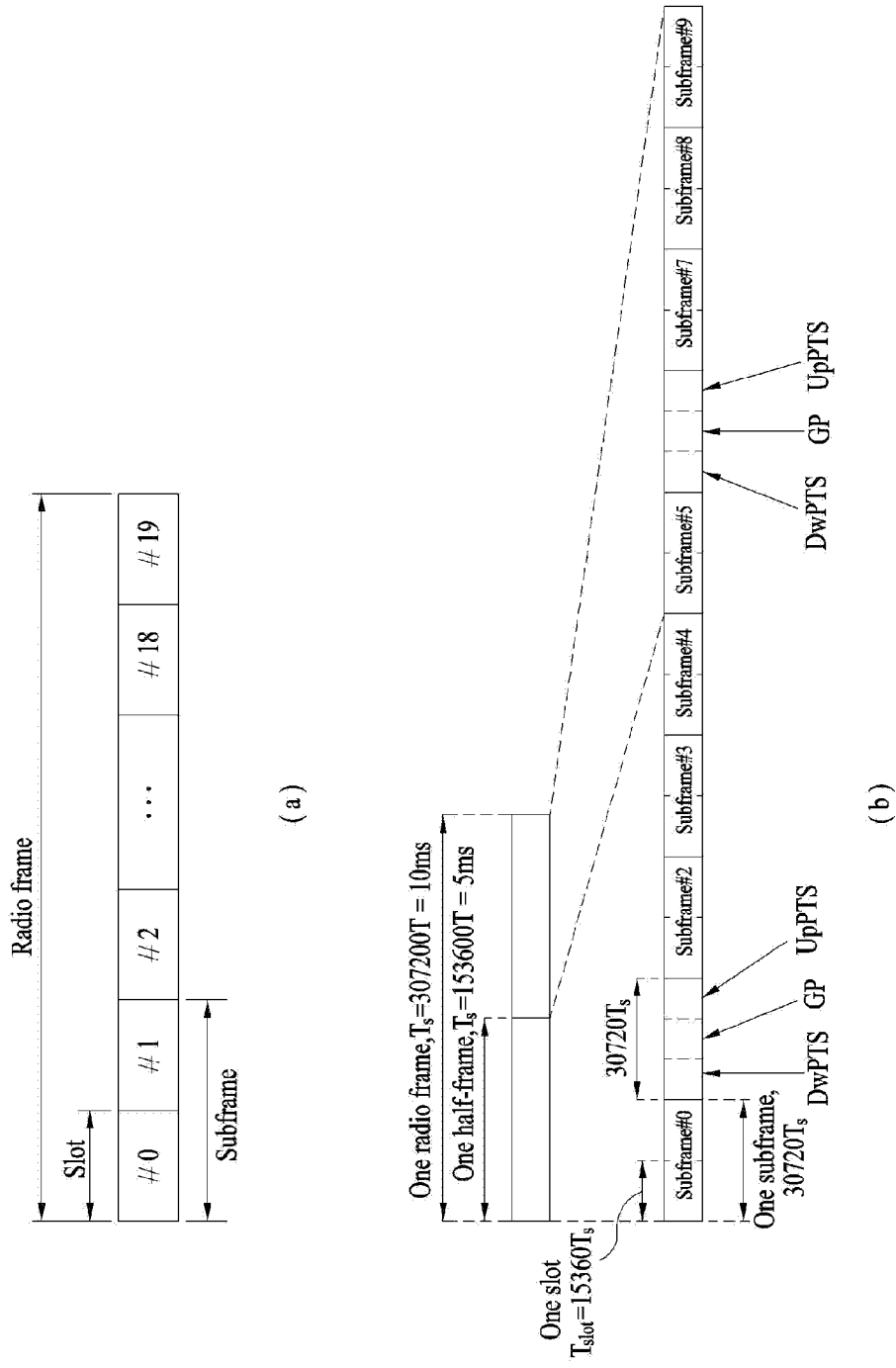
FIG. 1 is a diagram illustrating a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used in the embodiments of the present invention are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

A description will be given of a radio frame structure of 3GPP LTE with reference to FIG. 1.

In a cellular OFDM wireless packet communication system, uplink/downlink data packet transmission is performed on a subframe-by-subframe basis and one subframe is defined as a predetermined time interval including a plurality of OFDM symbols. 3GPP LTE supports type-1 radio frame applicable to FDD (frequency division duplex) and type-2 radio frame applicable to TDD (time division duplex).

FIG. 1(a) illustrates a type-1 radio frame structure. A downlink radio frame includes 10 subframes. Each subframe is further divided into two slots in the time domain. A unit time during which one subframe is transmitted is defined as a transmission time interval (TTI). For example, one subframe may be 1ms in duration and one slot may be 0.5 ms in duration. A slot may include a plurality of OFDM symbols in the time domain and a plurality of resource blocks (RBs) in the frequency domain. Since 3GPP LTE adopts OFDMA for downlink, an OFDM symbol represents one symbol period. An OFDM symbol may be referred to as an SC-FDMA symbol or symbol period. A resource block (RB) is a resource allocation unit including a plurality of contiguous subcarriers in a slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the duration of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

In a case where a normal CP is used, a slot includes 7 OFDM symbols and 1 subframe includes 15 OFDM symbols. Here, the first 2 or 3 OFDM symbols of each subframe can be allocated to PDCCH (physical downlink control channel), and the other OFDM symbols can be allocated to PDSCH (physical downlink shared channel).

FIG. 1(b) illustrates a type-2 radio frame structure. The type-2 radio frame includes 2 half frames. Each half frame includes 5 subframes, a downlink pilot time slot (DwPTS), a guard period (GP) and an uplink pilot time slot (UpPTS). One subframe consists of 2 slots. The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between UL and DL. One subframe includes 2 slots irrespective of radio frame type.

The radio frame structure is purely exemplary and thus the number of subframes in a radio frame, the number of slots in a subframe, or the number of OFDM symbols in a slot may vary.

Figure 2:
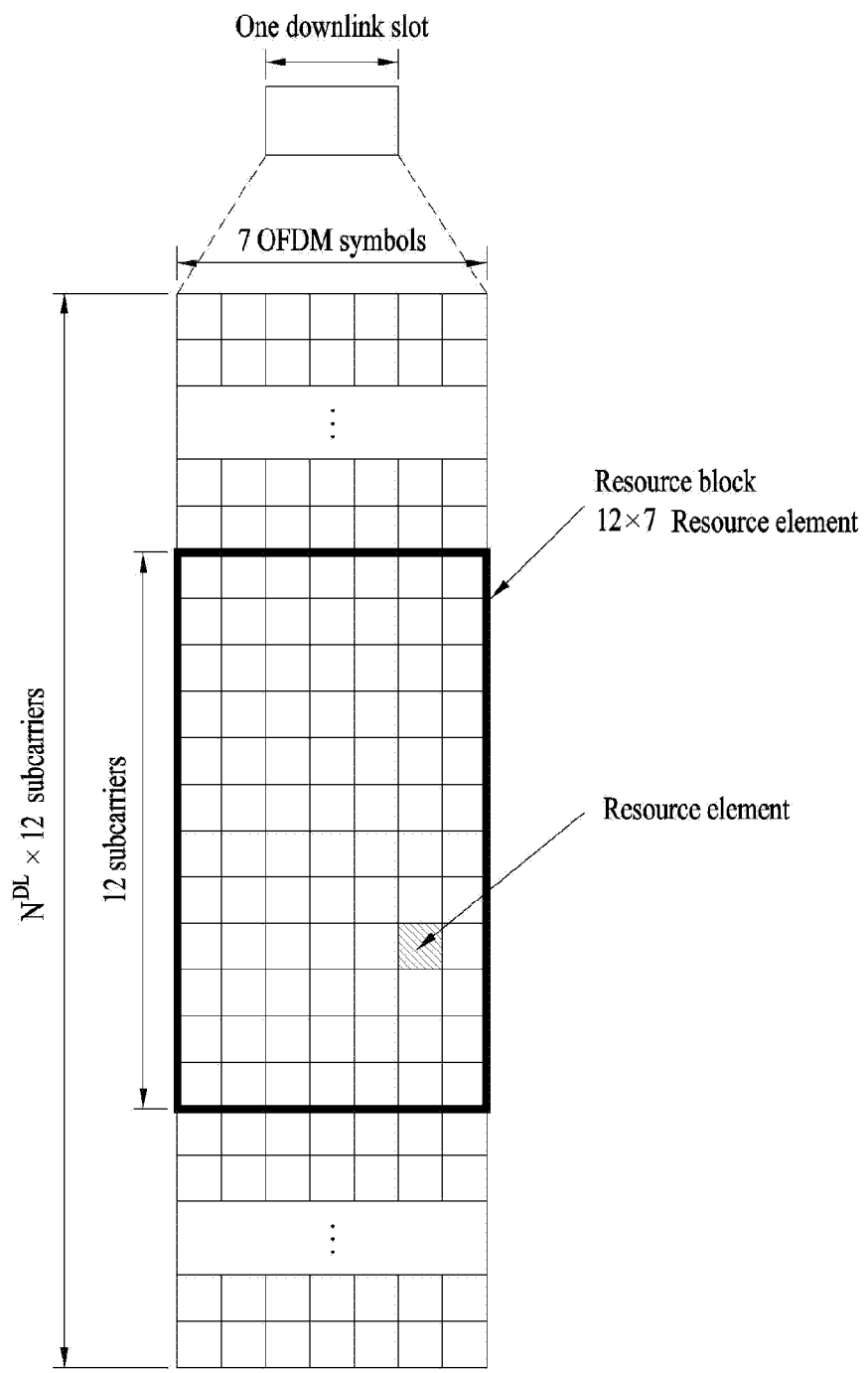
FIG. 2 is a diagram illustrating a resource grid of a downlink slot.

FIG. 2 illustrates a resource grid in a downlink slot. While one downlink slot includes 7 OFDM symbols in the time domain and one RB includes 12 subcarriers in the frequency domain in FIG. 2, the present invention is not limited thereto. For example, one slot includes 7 OFDM symbols in the case of normal CP whereas one slot includes 6 OFDM symbols in the case of extended CP. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 3:
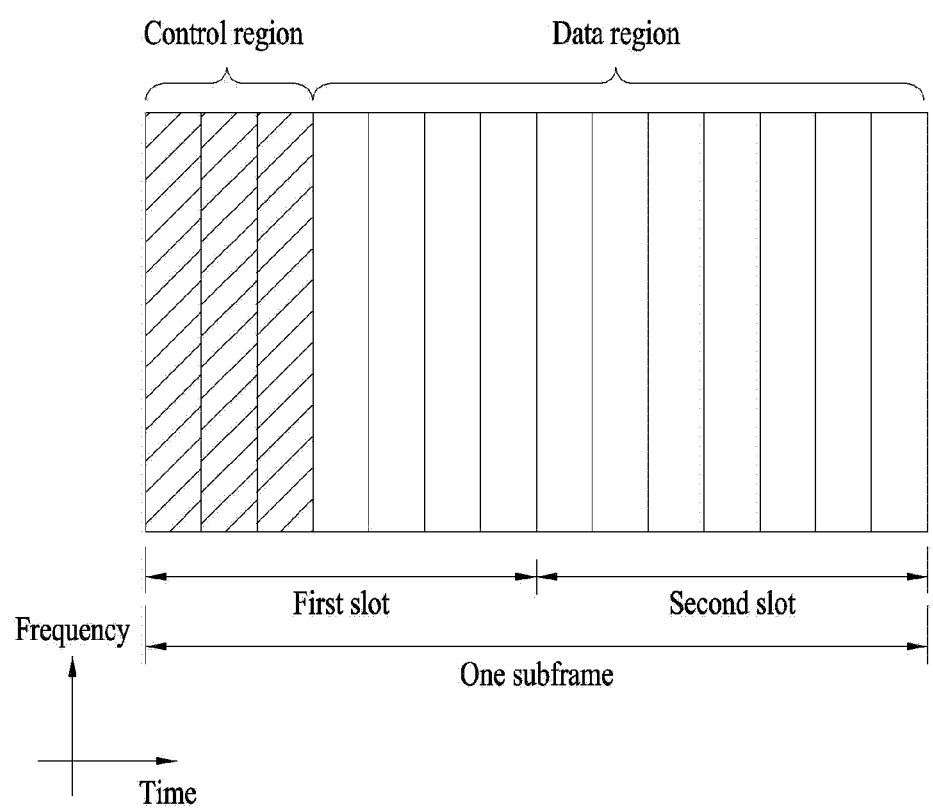
FIG. 3 is a diagram illustrating a downlink subframe structure.

FIG. 3 illustrates a downlink subframe structure. A maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response to uplink transmission and carries HARQ acknowledgment (ACK)/negative-acknowledgment (NACK) signal. Control information transmitted through the PDCCH is referred to as downlink control information (DCI). The DCI includes uplink or downlink scheduling information or uplink Tx power control commands for an arbitrary UE group. The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of voice over IP (VoIP), etc. A plurality of PDCCHs can be transmitted within a control region. The UE can monitor the plurality of PDCCHs. The PDCCH is transmitted on an aggregate of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with an identifier referred to as a radio network temporary identifier (RNTI) according to an owner or usage of the PDCCH. If the PDCCH is for a specific UE, a cell-RNTI (C-RNTI)) of the UE may be masked to the CRC. Alternatively, when the PDCCH is for a paging message, a paging indicator identifier (P-RNTI) may be masked to the CRC. When the PDCCH is for system information (more specifically, a system information block (SIB)), a system information identifier and system information RNTI (SI-RNTI) may be masked to the CRC. To indicate a random access response corresponding to a response to transmission of a random access preamble of the UE, a random access-RNTI (RA-RNTI) may be masked to the CRC.

Figure 4:
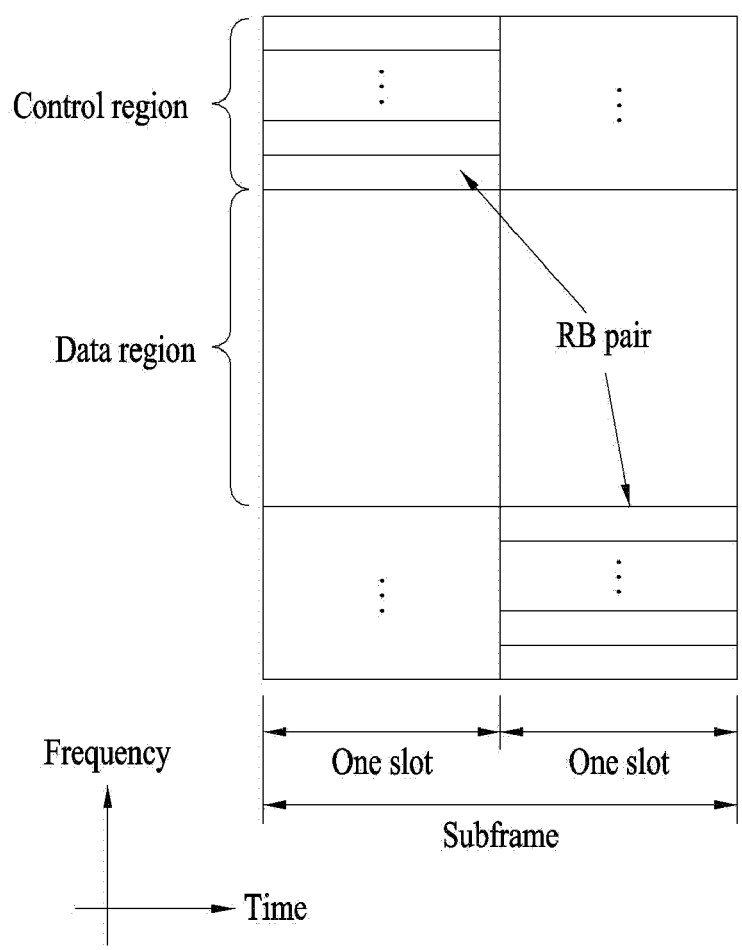
FIG. 4 is a diagram illustrating an uplink subframe structure.

FIG. 4 illustrates an uplink subframe structure. An uplink subframe may be divided into a control region and a data region in the frequency domain. The control region is allocated a PUCCH including uplink control information. The data region is allocated a PUSCH including user data. To maintain single carrier property, one UE cannot simultaneously transmit a PUCCH and a PUSCH. A PUCCH for a UE is allocated to an RB pair. RBs belonging to an RB pair occupy different subcarriers in 2 slots. That is, an RB pair allocated to a PUCCH is frequency-hopped at a slot boundary.

PSS (Primary Synchronous Signal)/SSS (Secondary Synchronous Signal)

Figure 5:
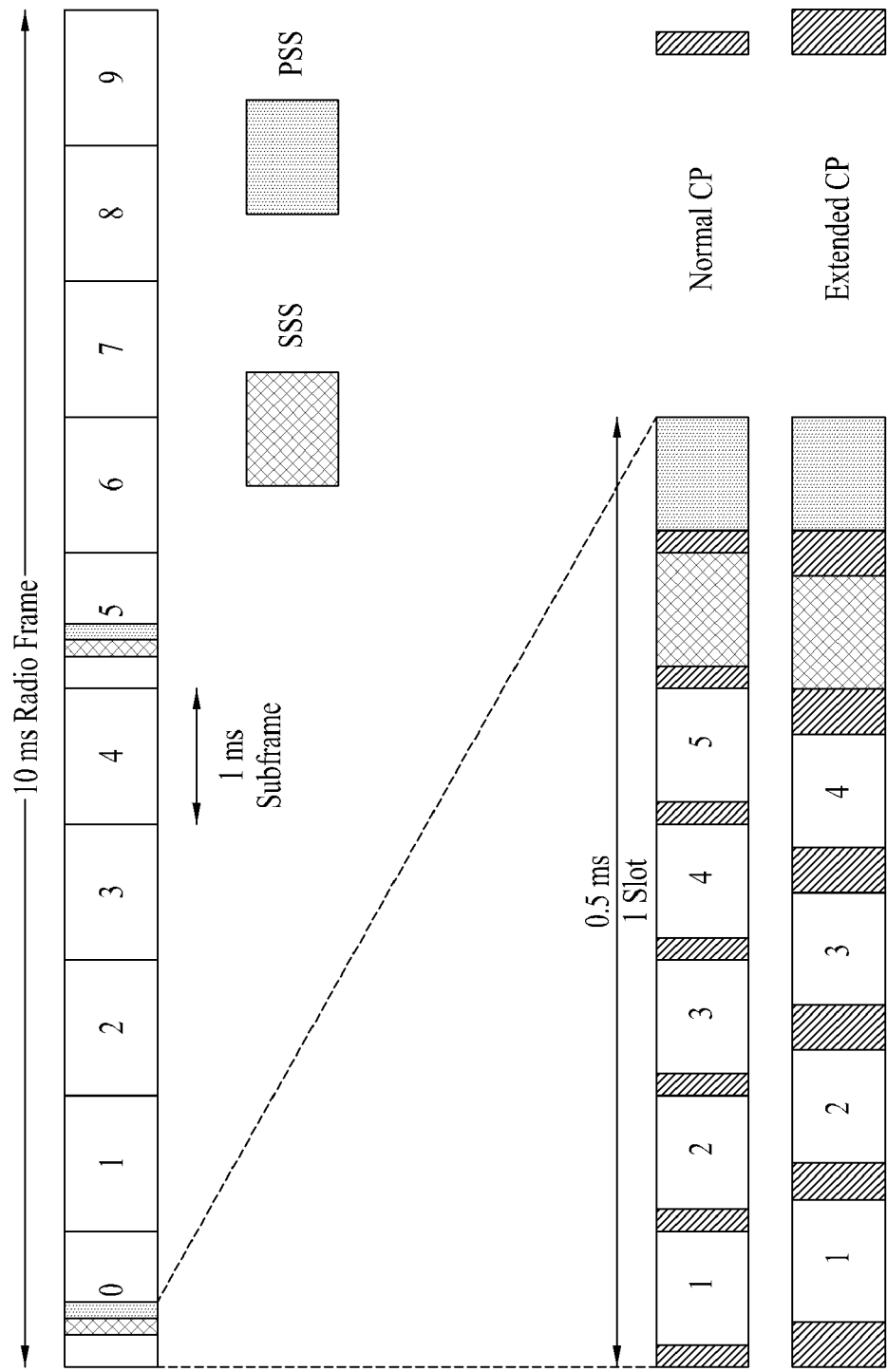
FIG. 5 is a diagram for explaining PSS/SSS in an FDD system.

FIG. 5 is a diagram illustrating a PSS and an SSS, which are synchronous signals used for cell search in an LTE/LTE-A system. Cell search will be described prior to description of the PSS and the SSS. When the user equipment is initially connected to a cell, cell search is performed if the user equipment performs handover from a cell, to which the user equipment is currently connected, to another cell, or is performed for cell reselection. Cell search may be performed by frequency and symbol synchronous acquisition of the cell, downlink frame synchronous acquisition of the cell, and determination of cell identifier (ID). Three cell IDs may constitute one cell group, and 168 cell groups may exist.

For cell search, a base station transmits the PSS and the SSS. The user equipment may acquire 5 ms timing of the cell by detecting the PSS and identify cell ID within the cell group. In addition, the user equipment may identify radio frame timing and cell group by detecting the SSS.

Referring to FIG. 5, the PSS is transmitted from subframes 0 and 5. In more detail, the PSS is transmitted from the last OFDM symbol of the first slot at subframes 0 and 5. In addition, the SSS is transmitted from the last second OFDM symbol of the first slot of subframes 0 and 5. That is, the SSS is transmitted from the OFDM symbol just before the PSS is transmitted. This transmission timing corresponds to FDD (Frequency Division Duplex). In case of TDD (Time Division Duplex), the PSS is transmitted from the third symbol of subframes 1 and 6, that is, DwPTS, and the SSS is transmitted from the last symbol of subframes 0 and 5. That is, in TDD, the SSS is transmitted as much as three symbols prior to the PSS.

The PSS is a Zadoff-Chu sequence of length 63, and in real transmission, 0 is padded at both ends of the sequence, whereby the sequence is transmitted on 73 subcarriers (72 subcarriers except DC subcarrier, that is, 6 RBs) in the middle of a system frequency bandwidth. The SSS is a sequence of length 62, which is obtained as two sequences of length 31 are frequency-interleaved, and is transmitted on 72 subcarriers in the middle of a full system bandwidth in the same manner as the PSS.

PBCH (Physical Broadcast Channel)

Figure 6:
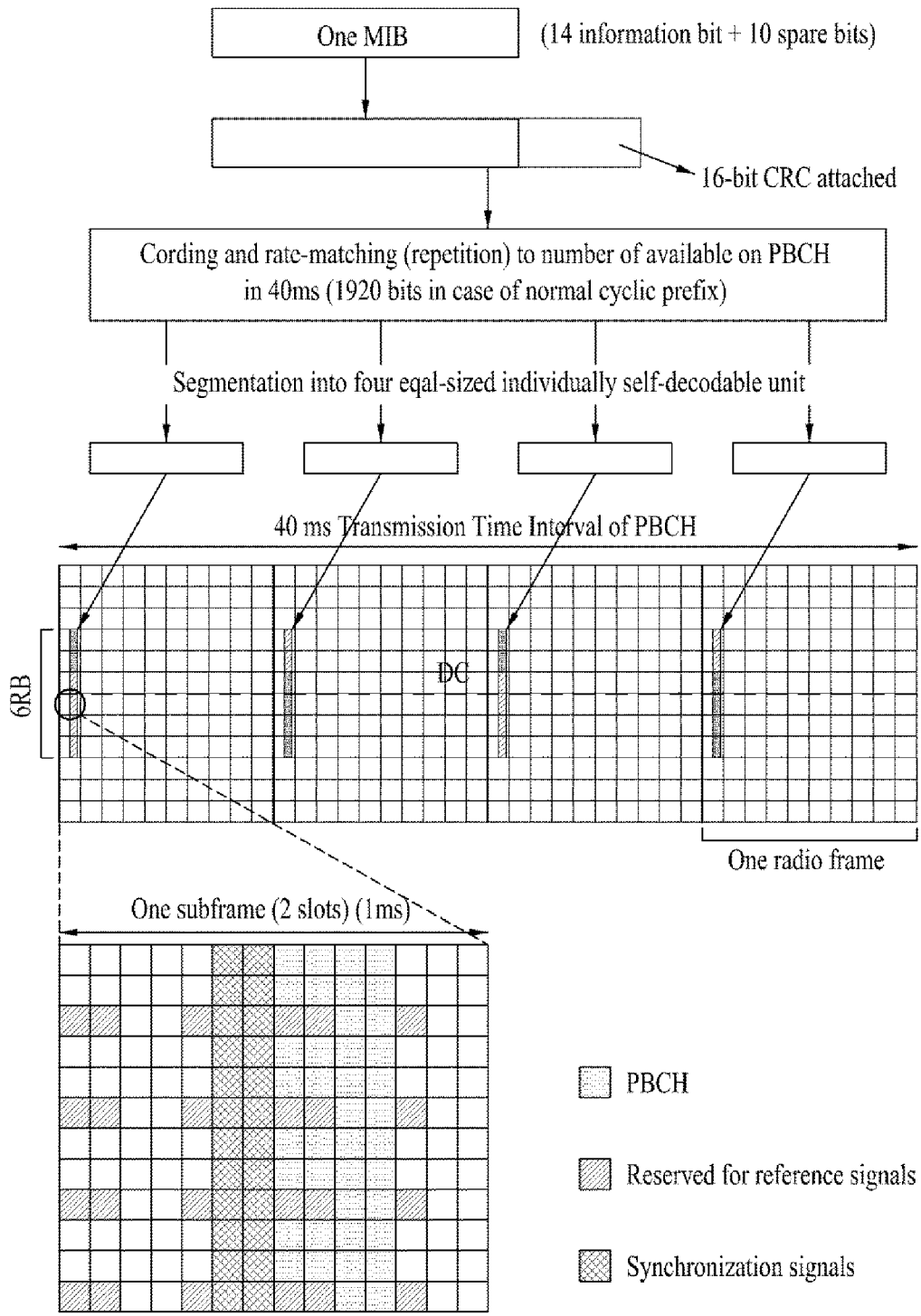
FIG. 6 is a diagram for explaining a PBCH.

FIG. 6 is a diagram illustrating a physical broadcast channel (PBCH). The PBCH is the channel to which system information corresponding to a master information block (MIB) is transmitted, and is used to allow the user equipment to obtain system information after acquiring downlink synchronization and cell ID through the aforementioned PSS/SSS. In this case, the MIB may include downlink cell bandwidth information, PHICH configuration information, subframe number (SFN), etc.

One MIB, as shown in FIG. 6, is transmitted through a first subframe of each of four continuous radio frames. In more detail, the PBCH is transmitted from first four OFDM symbols of the second slot of the subframe 0 at four continuous radio frames. Accordingly, the PBCH for transmitting one MIB is transmitted at a period of 40 ms. The PBCH is transmitted on 72 subcarriers in the middle of the full bandwidth on a frequency axis, which corresponds to the smallest downlink bandwidth, 6 RBs. This serves to allow the user equipment to decode BCH without problem even though the user equipment does not know the size of the full system bandwidth.

Moving Cell

A moving cell may be considered as a small cell in a hierarchical cell structure of a macro cell and a small cell. For example, the moving cell may be a small base station mounted on a physically moving device (e.g., a bus or a train, or a transportation means such as a smart car). On the other hand, a macro cell can be a fixed cell as it is.

Since the fixed cell (or the macro cell) and the moving cell construct a hierarchical cell structure, the moving cell can be seen as UE in view of the macro cell. However, the moving cell must be able to transmit and receive a large amount of aggregated traffic by a plurality of UEs unlike a existing UE. Accordingly, a wireless backhaul link is established between the moving cell and the fixed cell for supporting massive aggregated traffic.

Meanwhile, since the moving cell is serving the UEs, the moving cell is regarded as a serving cell rather than another UE. The moving cell provides group mobility to the UEs that it serves through physical movement and handover. In-band communication within the moving cell can support full duplex.

As shown in Table 1, various types of moving cells can be considered, and each characteristic according to the type of moving cell should be considered.

TABLE 1

| Category | Backhaul Distance | Mobility | Moving Pattern | Access Link User Load |
| --- | --- | --- | --- | --- |
| Public Transportation | Long | Wide speed range | Fixed | Medium/High |
| Smart Car | Medium/Short | Wide speed range | Arbitrary | Low/Medium |
| Personal Cell | Various | Low speed range | Arbitrary | Low/Medium |

Figure 7:
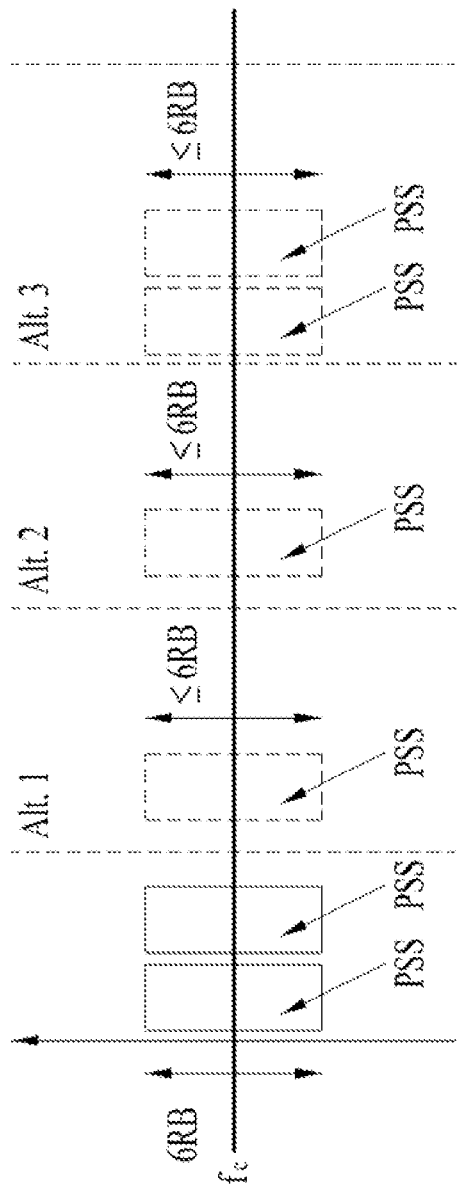
FIG. 7 is a diagram for explaining transmission of a synchronization signal for a moving cell and a legacy synchronization signal in different frequency regions according to an embodiment of the present invention.

FIG. 7 is a diagram for explaining transmission of a synchronization signal for a moving cell and a legacy synchronization signal in different frequency regions according an embodiment of the present invention.

As shown in the leftmost side of FIG. 7, a synchronization signal in the LTE/LTE-A system is configured with a primary synchronization signal (PSS) and a secondary synchronization signal (SSS). The synchronization signal is mapped to a region with the length of 6 RBs (resource blocks) with a DC component as the center and then transmitted through a carrier frequency (fc). According to the embodiment of the present invention, to transmit the synchronization signal for the moving cell and the synchronization signal for the legacy user equipment in the different frequency regions based on the above explanation, (1) only a PSS configured for the moving cell may be transmitted in a frequency region with a length equal to or less than 6 RBs (Alt. 1 in FIG. 7), (2) only an SSS configured for the moving cell may be transmitted in the frequency region with the length equal to or less than 6 RBs (Alt. 2 in FIG. 7), or (3) both of the PSS and the SSS configured for the moving cell may be transmitted in the frequency region with the length equal to or less than 6 RBs (Alt. 3 in FIG. 7).

Although it is assumed in FIG. 7 that the synchronization signal for the moving cell is also transmitted at a location symmetrical with respect to the carrier frequency (fc), the present invention is not limited thereto.

Figure 8:
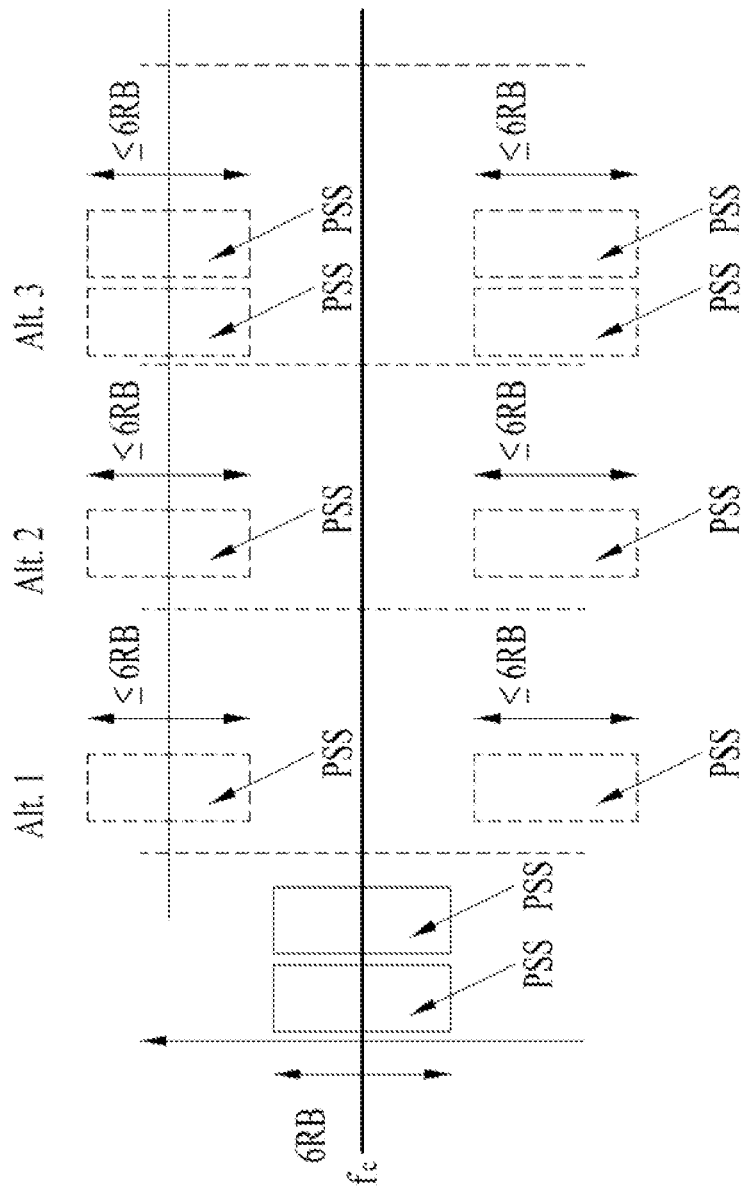
FIG. 8 is a diagram for explaining transmission of a synchronization signal for a moving cell and a legacy synchronization signal in different frequency regions according to another embodiment of the present invention.

FIG. 8 is a diagram for explaining transmission of a synchronization signal for a moving cell and a legacy synchronization signal in different frequency regions according another embodiment of the present invention.

Specifically, the embodiment of FIG. 8 illustrates an example of transmitting the synchronization signal for the moving cell after mapping the synchronization signal to locations that are n apart from the carrier frequency in the positive (+) direction and/or in the negative (−) direction. Here, although a value of n is not specifically limited, it may be selected from a range of '−(system bandwidth/2)≤n≤ (system bandwidth/2)'.

In the example of FIG. 8, each synchronization signal sequence for the moving cell may also be mapped to a frequency region with a length equal to or less than 6 RBs and then transmitted. In addition, regarding the synchronization signal for the moving cell, (1) only a PSS configured for the moving cell may be transmitted at a location ±n away from the carrier frequency in the frequency region with the length equal to or less than 6 RBs (Alt. 1 in FIG. 8), (2) only an SSS configured for the moving cell may be transmitted at the location ±n away from the carrier frequency in the frequency region with the length equal to or less than 6 RBs (Alt. 2 in FIG. 8), or (3) both of the PSS and the SSS configured for the moving cell may be transmitted at locations ±n away from the carrier frequency in the frequency region with the length equal to or less than 6 RBs (Alt. 3 in FIG. 8).

The synchronization signals for the moving cell transmitted according to FIGS. 7 and 8 may correspond to an additionally transmitted signal other than the synchronization signal of the legacy system. Although the additionally transmitted signal may be the PSS, SSS or combination thereof as shown in FIGS. 7 and 8, a new sequence defined for the moving cell may be used.

If the above-described synchronization signal sequence for the moving cell corresponds to the PSS, SSS or combination thereof, instead of or in addition to using the frequency region different from that used in the legacy system, a sequence different from that in the legacy system may be used as follows.

In consideration of a moving cell to be accommodated in a 5G wireless communication environment, if a user of a UE gets on a bus, a train, or a vehicle, the UE recognizes a moving cell of the bus, the train, or the vehicle as a serving cell thereof. The UE may exchange a DL/UL control signal or DL/UL data through the moving cell. Such an environment is different from small cell based communication of a fixed type that has considered up to a legacy 4G wireless communication environment. On a bus, a train, or a vehicle, since a plurality of UEs should be simultaneously serviced, it is expected that reliability or latency of a communication service will be a more important issue. In other words, the moving cell should provide a high quality service to users so as to be transparent to environment variation according to mobility thereof. To this end, the moving cell needs to discern the presence of other moving cells that can disappear after instantaneously appearing therearound and control interference caused by the other moving cells.

Figure 9:
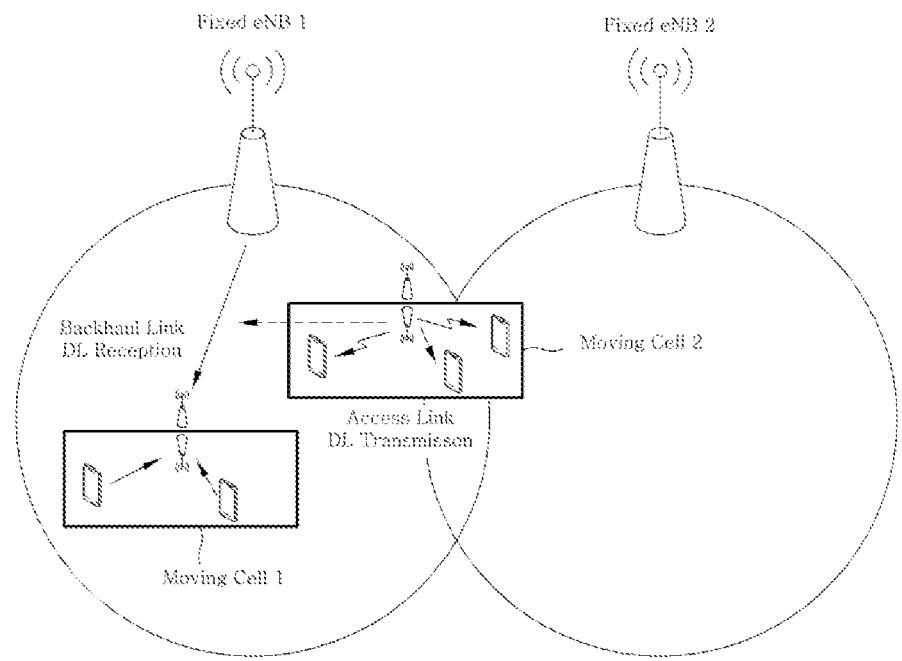
FIGS. 9 and 10 are diagrams for explaining interference between moving cells according to an embodiment of the present invention.
Figure 10:
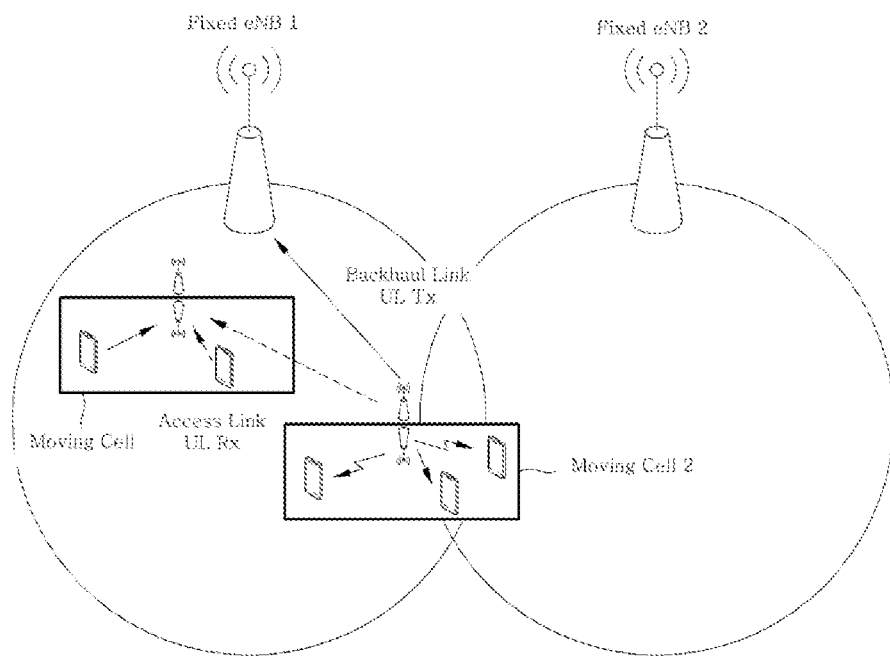

FIGS. 9 and 10 illustrate an interference scenario of moving cells according to an embodiment of the present invention.

FIG. 9 illustrates a scenario in which access link DL transmission of a second moving cell causes interference with respect to backhaul link DL reception of a first moving cell. FIG. 10 illustrates a scenario in which backhaul link UL transmission of the second moving cell causes interference with respect to access link UL reception of the first moving cell.

In this way, since moving cells that pass a specific moving cell cause interference with respect to the specific moving cell, it is necessary to control such interference. If a backhaul interface of a moving cell is configured to detect only a specific PSS (e.g., legacy PSS), the backhaul interface of the moving cell cannot detect a PSS which is newly designed for an access interface of a neighbor moving cell. The newly designed PS serves to block access to a neighbor moving cell. Accordingly, a method for enabling a specific moving cell to identify interference causing moving cells appearing around the specific moving cell is needed.

Hereinafter, embodiments in which a moving cell identifies neighbor moving cells that cause interference while passing thereby in a wireless communication environment are proposed. A situation in which moving cells operate when a physical layer cell ID (PCID) based on the above-described new PSS is applied is assumed. In addition, a situation in which both access-to-backhaul link interference and backhaul-to-access link interference use the same carrier is assumed.

In a situation in which the technology of the present invention is applied based on an LTE/LTE-A system, as an embodiment of the present invention, a fixed eNB may broadcast system information (e.g., SIB) about all moving cells in coverage thereof. Information that the SIB should include may be, for example, a PCID of a moving cell and frequency of an access/backhaul link of the moving cell.

Table 2 illustrates a SIB 9 (System Information Block Type 9 information element) including information on a Home eNB among SIB messages described in the existing LTE/LTE-A.

TABLE 2

| SystemInformationBlockType9 ::= | SEQUENCE { | |
|---|---|---|
| hnb-Name | | OCTET STRING |
| (SIZE(1..48)) | OPTIONAL, | -- Need OR |
| .... | | |
| lateNonCriticalExtension | | OCTET STRING |
| OPTIONAL} | | |

According to an embodiment of the present invention, for example, SIB 10 (System Information BlockType 10 information element) can be defined as a new SIB. The SIB 10 contains information for the moving cell. Table 3 illustrates SIB 10 according to one embodiment of the present invention.

TABLE 3

```
SystemInformationBlockType10 ::=    SEQUENCE {
   NeighMovingCellList               NeighMOvingCellList    OPTIONAL,
   -- Need OR
   ...,
   lateNonCriticalExtension          OCTET STRING
   OPTIONAL
}
NeighMovingCellList ::=    SEQUENCE (SIZE (1..maxMovingCell)) OF
NeighMovingCellInfo
NeighMovingCellInfo ::=    SEQUENCE {
   physCellId                                PhysCellId,
   BLcarrierFreq                             ARFCN-ValueUTRA
   ALcarrierFreq                             ARFCN-ValueUTRA
   ...
}
```

SIB 10 is information that a fixed eNB broadcasts. The fixed eNB updates SIB 10 whenever a new cell enters coverage thereof or leaves coverage thereof and provides updated SIB 10 to UEs present in coverage thereof. The fixed eNB includes information acquired from a moving cell in SIB 10 in a process of configuring a wireless connection based X2 interface with the moving cell.

For example, in an FDD system, a UL/DL EARFCN (E-UTRA Absolute Radio Frequency Channel Number) and a UL/DL transmission bandwidth may be included in SIB 10. In a TDD system, the EARFCN, the transmission bandwidth, and a UL/DL subframe configuration may be included in SIB 10.

Figure 11:
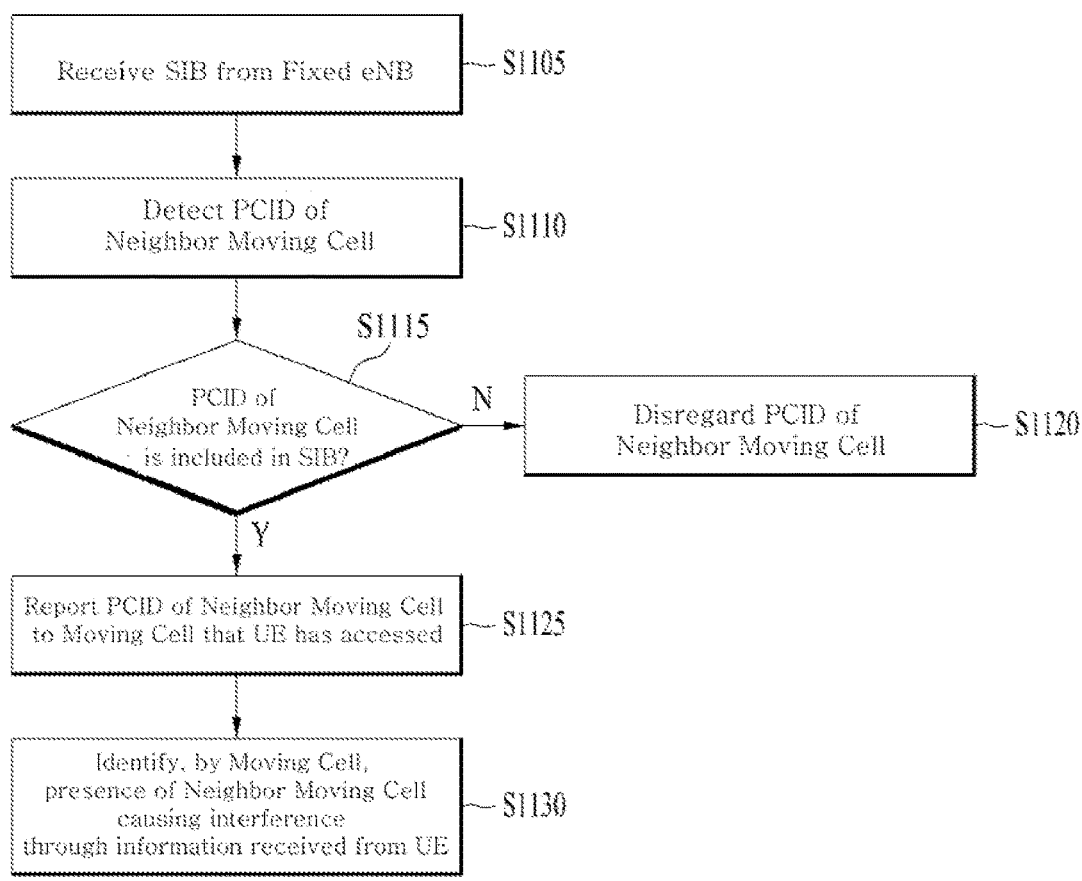
FIG. 11 is a flowchart illustrating a method for identifying a moving cell causing interference according to an embodiment of the present invention.

FIG. 11 illustrates a method in which a moving cell identifies neighbor moving cells according to an embodiment of the present invention.

In this embodiment, a UE entering a moving cell may receive information about moving cells present within a fixed eNB from the fixed eNB and identify moving cells approaching the moving cell to which the UE belongs. For example, the UE may sense PCIDs of neighbor moving cells that pass the moving cell to which the UE belongs, based on information of SIB 10 received from the fixed eNB.

Meanwhile, a backhaul interface of a moving cell cannot detect PCIDs on an access link of other moving cells, as described above. Therefore, in this embodiment, the UE may identify other moving cells so that the UE may inform a moving cell that the UE has accessed of presence of other moving cells causing interference.

Referring to FIG. 11, a UE that has accessed a first moving cell receives, through an SIB, information about other moving cells present in coverage of a fixed eNB that the first moving cell has accessed (S1105). The UE may periodically receive the SIB including the information about other moving cells or may receive the SIB whenever the information about moving cells present in coverage of the fixed eNB is changed.

The UE collects PCIDs of other moving cells located around the first moving cell by performing cell search in order to identify moving cells that actually cause interference around the first moving cell (S1110).

The UE determines whether the PCIDs of the moving cells, collected through cell search, are included in the SIB received from the fixed eNB (S1115).

If the PCIDs of the moving cells, corrected through cell search, are not included in the SIB, the UE disregards the PCIDs without informing the first moving cell that the UE has accessed (S1120).

If the PCIDs of the moving cells, corrected through cell search, are included in the SIB, the UE regards the moving cells having the PCIDs as moving cells causing interference and reports the moving cells causing interference to the first moving cell that the UE has accessed (S1125).

The first moving cell identifies presence of the moving cells causing interference that pass the first moving cell, through information received from the UE that has accessed the first moving cell (S1130). Meanwhile, upon identifying presence of the moving cells causing interference, the first moving cell may schedule the UE by avoiding interference from the moving cells causing interference. The first moving cell may acquire information about the moving cells causing interference from a fixed eNB.

In this way, the first moving cell may identify moving cells actually causing interference with UEs thereof. For example, numerous moving cells (e.g., 30 to 40 moving cells) may be present at a specific timing in the same place (e.g., within a radius 100 m), the first moving cell recognizes only some moving cells (e.g., two or three moving cells) of which UEs connected to the first moving cells inform the first moving cell as the moving cells causing interference. Accordingly, the range of the moving cells causing interference that are to perform interference measurement can be effectively reduced and overhead of interference measurement can be reduced.

Hereinafter, a description will be given of a method by which a first moving cell, which identifies moving cells causing interference, can avoid the interference. In the following description, a first moving cell is referred to as a victim moving cell and a moving cell causing interference is referred to as an aggressor moving cell.

According to the interference control method proposed in the present invention, the victim moving cell can identify aggressor moving cells which cause actual interference to itself among a number of moving cells. Thus, the number of adjacent moving cells that the victim moving cell should measure for interference control is reduced. However, although the victim moving cell can recognize which moving cells are the aggressor moving cells causing the interference, the victim moving cell may not know the amount of the interference caused by each of the individual aggressor moving cell based on reports from UEs.

In an embodiment of the present invention, a scenario in which a signal transmitted at an access link interface (e.g., DL transmitter) of a second moving cell, which is adjacent to a first moving cell, causes interference to a signal received at a backhaul link interface (e.g., DL receiver) of the first moving cell is assumed as shown in FIG. 9. In this scenario, the access link interface (DL transmitter) of the second moving cell corresponds to an aggressor moving cell and the backhaul link interface (DL receiver) of the first moving cell corresponds to a victim moving cell. As described above, when a number of moving cells pass by a victim moving cell during a short time, the moving cells may cause interference to the victim moving cell. To solve this problem, the present invention propose a method for controlling and avoiding interference suitable for such a wireless communication environment.

According an embodiment of the present invention, all moving cell transmits information (e.g., CSI-RS configuration) necessary to measure interference from adjacent moving cells to a fixed eNB for interference control. The adjacent moving cell may measure interference using the corresponding information. In this case, whenever the information (e.g., CSI-RS configuration) required for interference measurement is changed, moving cells may transmit the changed information to the fixed eNB.

For example, when a moving cell enters coverage of the fixed eNB, the moving cell transmits CSI-RS configuration information about UEs on an access link to the fixed eNB. In addition, whenever the CSI-RS configuration information is changed, the moving cell transmits the changed information to the fixed eNB. The fixed eNB may adjust interference between a victim moving cell and aggressor moving cells based on CSI-RS configurations transmitted from moving cells.

A CSI-RS may be established for a backhaul link between the fixed eNB and each of the moving cells. To measure a quality of DL transmission on the backhaul link, the fixed eNB provides a CSI-RS configuration to the moving cells. Each moving cell receives a CSI-RS based on the CSI-RS configuration transmitted from the fixed eNB. The CSI-RS configuration may be provided to each moving cell through RRC signaling or X2 interface dedicated to each moving cell. To distinguish the CSI-RS transmitted through the backhaul link from the CSI-RS transmitted through the access link, the former CSI-RS is referred to as a moving cell-specific CSI-RS and the latter CSI-RS is referred to as a UE-specific CSI-RS.

UE-specific CSI-RS configurations transmitted from the moving cells is reflected in a moving cell-specific CSI-RS configuration for measuring interference caused to the victim moving cell. The fixed eNB may generate the moving cell-specific CSI-RS configuration for measuring the interference at the victim moving cell based on UE-specific CSI-RS configuration information on access links of the aggressor moving cells. Here, the moving cell-specific CSI-RS configuration for the interference measurement at the victim moving cell may correspond to a set of REs in an RB where a UE-specific CSI-RS on an access link of each of the aggressor moving cells is configured. According to the moving cell-specific CSI-RS configuration for the interference measurement, the set of the REs in the RB where the UE-specific CSI-RS on the access link of each of the aggressor moving cells is configured may be nulled. For instance, in the nulled REs, transmission of the moving cell-specific CSI-RS on the backhaul link from the fixed eNB is dropped and the UE-specific CSI-RS of the aggressor moving cell can be received and measured.

Although the present invention assumes that a CSI-RS is used for interference measurement for convenience of description, but it is possible to use a different type of RS. For example, it is possible to define a new moving cell-specific RS to measure interference between moving cells. The fixed eNB configures a set of REs for transmission of moving cell-specific RSs for moving cells connected to itself.

According an embodiment of the present invention, the RE set, which is configured to transmit the moving cell-specific RS, can be differently assigned to each moving cell. According to another embodiment, the fixed eNB may configure common resources, which are used to transmit the moving cell-specific RS, in a specific section for all moving cells within its coverage. In this case, even though physical locations of the moving cells are changed, the resources for the moving cell-specific RS transmission can be reused.

Information necessary for the victim moving cell to measure interference from the aggressor moving cells may be exchanged through RRC connection or X2 interface between each moving cell and the fixed eNB. In addition, the fixed eNB may maintain an index and a CSI-RS configuration of each of the moving cell which are connected to the fixed eNB.

The victim moving cell collects channel state information including results obtained by measuring the interference from the aggressor moving cells and then reports the collected channel state information to the fixed eNB. A time interval for such a report may be previously configured between the fixed eNB and the victim moving cell. During the configured time interval, the fixed eNB does not perform DL scheduling on the backhaul link with respect to the moving cell but receives channel state information with respect to adjacent moving cells from the moving cell.

The channel states, which cause interference to the victim moving cell depending on mobility of the aggressor moving cells, may be changed depending on time. The time interval, which is configured to report channel state information on the access links of the aggressor moving cells to the fixed eNB, may be determined/changed according to mobility (e.g., speed) of the victim moving cell and/or the aggressor moving cells. For example, when a victim moving cell with relatively high-speed reports a channel state of an aggressor moving cell in a stationary state to the fixed eNB or when a victim moving cell in the stationary state reports a channel state of an aggressor moving cell with relatively high-speed to the fixed eNB, there may be significant variation in the reported channel state information. Therefore, it is preferred to frequently perform the channel measurement by reducing the time interval for reporting the channel state.

On the other hand, when both of the victim moving cell and the aggressor moving cell are in the stationary state, it is expected that there may be no significant variation in the channel state information. Thus, the time interval for reporting the channel state can be increased. In addition, the victim moving cell may report feedback information with high resolution to the fixed eNB.

The victim moving cell may collect channel state information on the access links of the detected aggressor moving cells and then report the collected channel state information. The backhaul link interface of the victim moving cell receives the UE-specific CSI-RS to measure the interference from the aggressor moving cells. Thereafter, the victim moving cell transmits, to the fixed eNB, channel state information according to a CSI-RS configuration corresponding to the received UE-specific CSI-RS. In this case, the channel state information may include a CQI and a PMI. In the scenario shown in FIG. 9, the victim moving cell and the aggressor moving cells may use the same carrier.

After receiving the channel state information from the victim moving cell, the fixed eNB controls the victim moving cell to allow it to avoid the interference from the aggressor moving cells. For interference avoidance, the victim moving cell may be provided with scheduling information on the access links of the aggressor moving cells. For example, the fixed eNB transmits a message for requesting each of the aggressor moving cells to send scheduling information on its access link through the wireless X2 interface. Each of the aggressor moving cells transmits a response message including the scheduling information on its access link to the fixed eNB. The scheduling information on the access links may include DL subframe configuration information.

Based on the scheduling information on the access links received from the aggressor moving cells, the fixed eNB schedules backhaul link DL transmission for the victim moving cell. For instance, the backhaul link DL transmission is performed based on a subframe configuration different from that configured for the access links of the aggressor moving cells. That is, even though the victim moving cell and the aggressor moving cells operate based on the same carrier, different scheduling resources (e.g., subframes) may be allocated. By doing so, the fixed eNB may allow the victim moving cell to avoid the interference.

Since the fixed eNB cannot obtain scheduling information on an access link of each of the moving cells connected to the corresponding fixed eNB, a procedure for allowing the fixed eNB to obtain the scheduling information on the access links is defined as described above.

After sending the response according to the request for the scheduling information on its access link, each of the aggressor moving cells should maintain the subframe configuration, which is reported to the fixed eNB, to avoid the interference with the victim moving cell until there is a separate request from the fixed eNB.

When the victim moving cell recognizes that the aggressor moving cells disappear (i.e., interference from the aggressor moving cells is cancelled) based on the channel state information, the victim moving cell transmits an indicator indicating that the aggressor moving cells disappear to the fixed eNB. Thereafter, the fixed eNB informs the aggressor moving cells of the above result to allow the aggressor moving cells to change subframe configurations in next DL scheduling.

Figure 12:
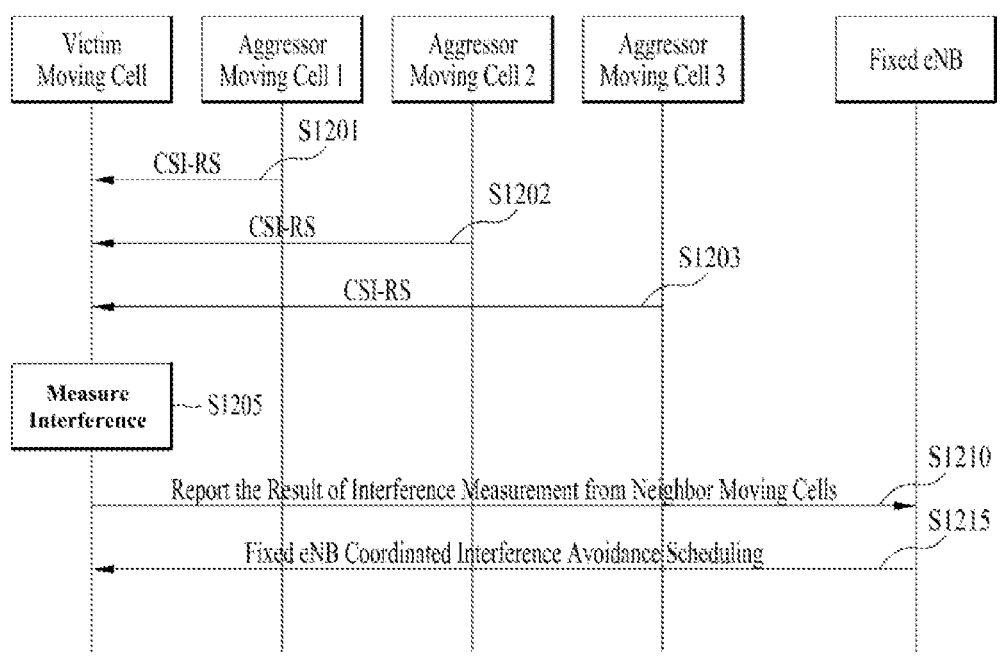
FIG. 12 is a flowchart illustrating a method for avoiding interference according an embodiment of the present invention.

FIG. 12 is a flowchart illustrating a method for avoiding interference according an embodiment of the present invention. To avoid redundant description, the above-described features will be omitted herein.

The victim moving cell receives UE-specific CSI-RSs from the aggressor moving cells [S1201, S1202, and S1203]. Although a UE-specific CSI-RS is selected as an example in the present embodiment, the present invention is not limited thereto.

The victim moving cell measure interference from the aggressor moving cells based on the received UE-specific CSI-RSs [S1205].

The victim moving cell reports a result of the interference measurement to the fixed eNB [S1210]. In this case, the result of the interference measurement may include channel state information on the aggressor moving cells. To transmit the channel state information on the aggressor moving cells to the fixed eNB, the victim moving cell may use a wireless backhaul interface. Here, the wireless backhaul interface may be a wireless X2 interface.

The fixed eNB performs interference avoidance scheduling for the victim moving cell [S1215]. As an example of the interference avoidance scheduling, the method for scheduling the victim moving cell and the aggressor moving cells using different resources is described above. However, the present invention is not limited thereto and beam control can be considered as another example. Particularly, based on the channel state information reported by the victim moving cell, the fixed eNB may set a beam direction of the victim moving cell to be different from those formed in the access links of the aggressor moving cells.

Figure 13:
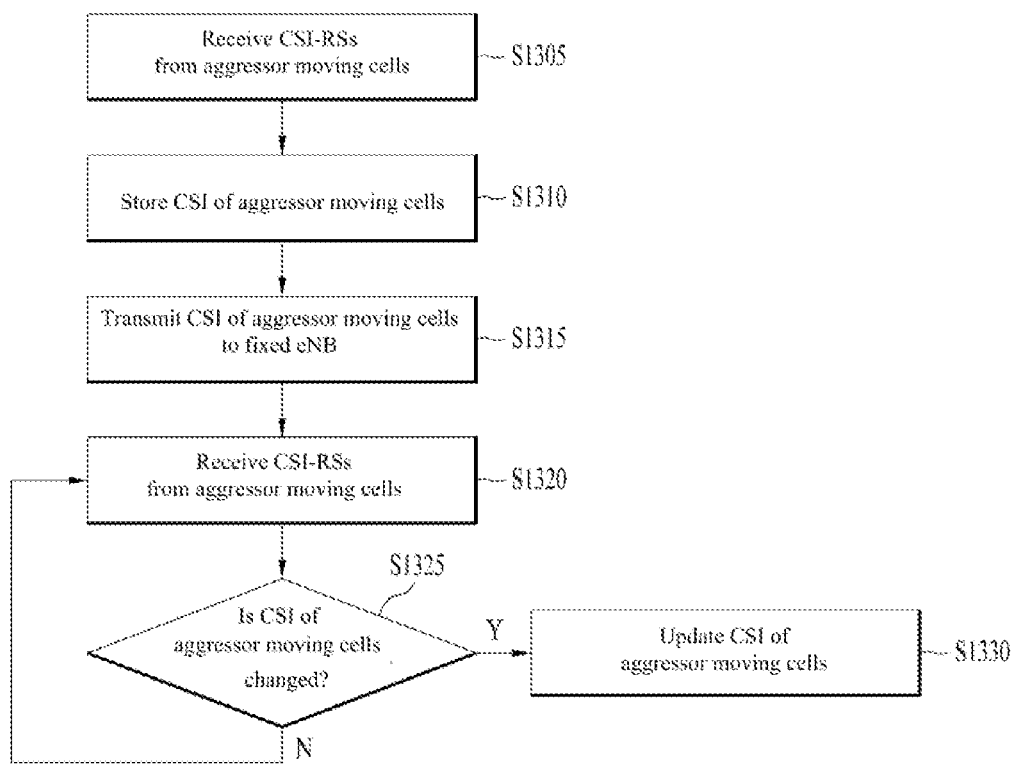
FIG. 13 is a flowchart illustrating a method for avoiding interference according another embodiment of the present invention.

FIG. 13 is a flowchart illustrating a method for avoiding interference according another embodiment of the present invention. To avoid redundant description, the above-described features will be omitted herein. In FIG. 13, it is assumed that measurement results of the access links of the aggressor moving cells are changed.

The victim moving cell receives UE-specific CSI-RSs from the aggressor moving cells [S1305].

The victim moving cell measures channel state information of the aggressor moving cells using the received UE-specific CSI-RSs and then stores the measured channel state information [S1315].

The victim moving cell reports the channel state information of the aggressor moving cells to the fixed eNB [S1315].

The victim moving cell receives UE-specific CSI-RSs from the aggressor moving cells again [S1320] and determines whether the channel state information of the aggressor moving cells is changed [S1325]. When the channel state information of the aggressor moving cells is changed, the victim moving cell transmits the changed channel state information to the fixed eNB.

As described above, interference can be measured based on new RSs transmitted from aggressor moving cells and interference measurement results can also be changed depending on time. In other words, since the aggressor moving cells may appear during a certain time and then disappear, the victim moving cell needs to report time varying attributes of the interference measurement results to the fixed eNB. Hence, reliability of the channel state information can be improved.

It is preferred to determine a period of the channel state information reported by the victim moving cell to the fixed eNB based on power consumption of the victim moving cell. However, if the victim moving cell covers its power consumption through independent power generation, the period for reporting the channel state information can be determined without consideration of the impact of the power consumption.

That is, although the victim moving cell cannot recognize synchronization signals (e.g., PSS/SSS or PSS/SSS/NSS) from the aggressor moving cells, the victim moving cell can avoid interference from the aggressor moving cells as follows. If there is interference from the aggressor moving cells, the victim moving cell may request the fixed eNB to perform the process for interference avoidance and thus the interference may be cancelled. When a number of moving cells are densely located in a small area, the aforementioned embodiments can be used to avoid interference between the moving cells.

In the aforementioned embodiments, all moving cells connected to the fixed eNB may be synchronized with the fixed eNB. In other words, timings for frame transmission/reception may be aligned.

The CSI-RS configurations on backhaul links, which are provided by the fixed eNB to moving cells, may be assigned in a moving cell-specific manner and the CSI-RS configurations on access links, which are provided by each of the moving cells to UEs, may be assigned in a UE-specific manner. When interference is caused by an access link to a backhaul link, the victim moving cell may measure a UE-specific CSI-RS of an aggressor moving cell based on the nulling configuration, which is set by the fixed eNB, even if the victim moving cell does not know a UE-specific CSI-RS configuration on the access link of the aggressor moving cell.

Since a moving cell transmits, to the fixed eNB, a CSI-RS configuration on its access link, which is allocated by the corresponding moving cell in the UE-specific manner, the fixed eNB may determine an RE region corresponding to an target for the interference measurement by considering the received CSI-RS configuration.

According another embodiment, when a new moving cell-specific RS is defined for the interference measurement, a common resource region for transmitting the moving cell-specific RS may be configured for moving cells. In this case, although a sequence is generated in a moving cell-specific manner, the moving cells may share the resource region for transmission.

In addition, when the victim moving cell does not know the UE-specific CSI-RS configuration of the aggressor moving cell, the victim moving cell feeds back information (e.g., RSRP) on power and timing used for transmission of the UE-specific CSI-RS transmitted to the fixed eNB. The fixed eNB may coordinate interference based on the transmission timing and power of the UE-specific CSI-RS.

Figure 14:
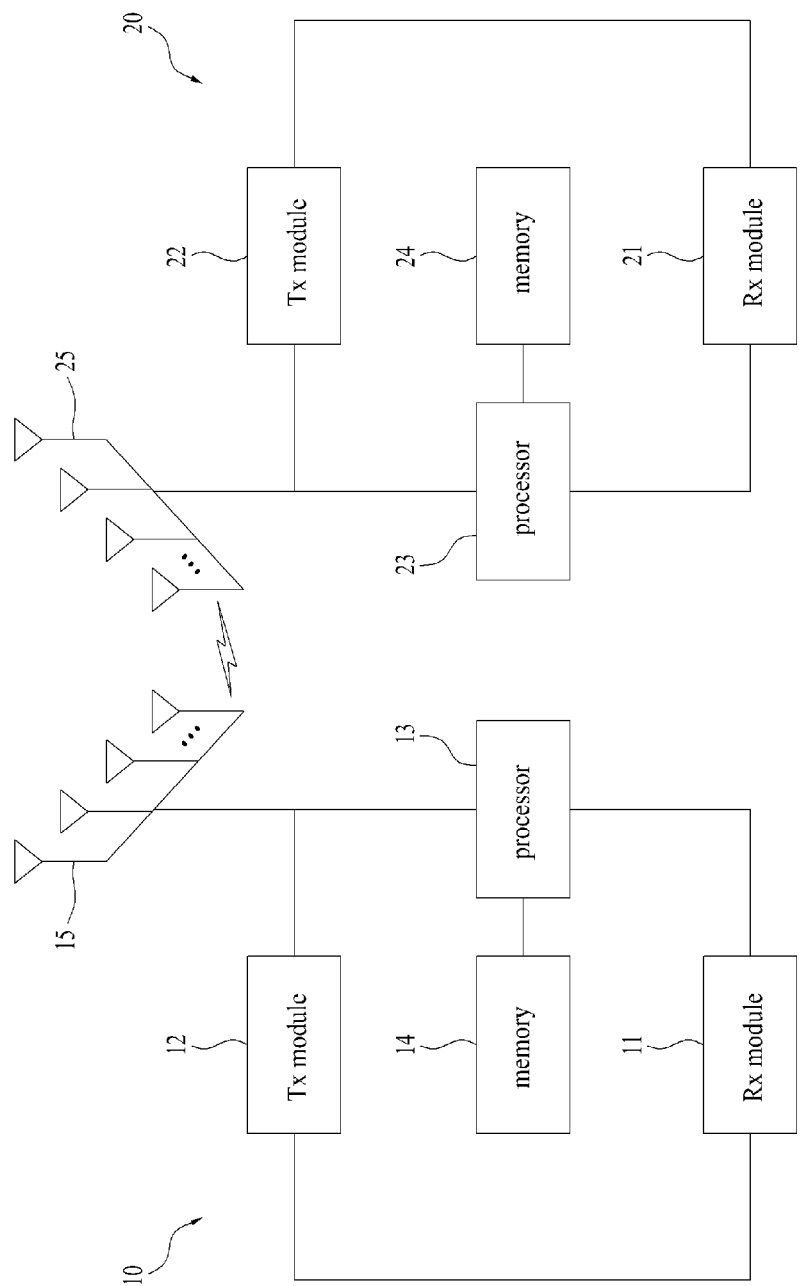
FIG. 14 is a block diagram illustrating a user equipment (UE) and an evolved node B (eNB) according to an embodiment of the present invention.

FIG. 14 is a block diagram illustrating a user equipment (UE) and an evolved node B (eNB) according to an embodiment of the present invention. In FIG. 14, the base station may be a fixed cell or a moving cell. In addition, the user equipment and the base station shown in FIG. 14 may perform the aforementioned methods.

Referring to FIG. 14, the eNB 10 may include a receiver 11, a transmitter 12, a processor 13, a memory 14 and a plurality of antennas 15. The plurality of the antennas 15 may mean that the eNB 10 supports MIMO transmission and reception. The receiver 11 can receive various signals, data and information in uplink from a UE. The transmitter 12 can transmit various signals, data and information in downlink to the UE. In addition, the processor 13 can control overall operation of the eNB 10.

The receiver 11 of the eNB 11 may perform reception operation on a backhaul link or an access link and the transmitter 12 of the eNB 10 may perform transmission operation on the backhaul link or the access link.

When the eNB 10 operates as a fixed eNB according to an embodiment of the present invention, the receiver 11 receives CSI-RS (channel state information-reference signal) configurations on access links of individual moving cells connected to the fixed eNB. The processor 13 determines a CSI-RS configuration on a backhaul link of a first moving cell among the moving cells based on the CSI-RS configurations on the access links. The transmitter 12 provides the first moving cell with the determined CSI-RS configuration on the backhaul link. In this case, the determined CSI-RS configuration on the backhaul link may be provided to measure interference caused to the backhaul link of the first moving cell by an access link of a second moving cell among the moving cells.

The processor 13 of the eNB 10 performs functions of operating and processing information received by the eNB 10, information to be externally transmitted by the eNB 10, and the like. The memory 14 can store the operated and processed information and the like for a prescribed period and can be substituted with such a component as a buffer (not shown in the drawing) and the like.

The UE 20 may include a receiver 21, a transmitter 22, a processor 23, a memory 24 and a plurality of antennas 25. The plurality of the antennas 25 may mean that the UE supports MIMO transmission and reception. The receiver 21 can receive various signals, data and information in downlink from an eNB. The transmitter 22 can transmit various signals, data and information in uplink to the eNB. In addition, the processor 23 can control overall operation of the UE 20.

The processor 23 of the UE 20 performs functions of operating and processing information received by the UE 20, information to be externally transmitted by the UE 20, and the like. The memory 24 can store the operated and processed information and the like for a prescribed period and can be substituted with such a component as a buffer (not shown in the drawing) and the like.

The embodiments of the present invention may be implemented by various means, for example, hardware, firmware, software, or combinations thereof.

When the embodiments of the present invention are implemented using hardware, the embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are to be embraced therein. Therefore, the present invention is not limited to the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by subsequent amendment after the application is filed.

INDUSTRIAL APPLICABILITY

The aforementioned embodiments of the present invention can be applied to various mobile communication systems.

What is claimed is:

1. A method for performing inter-cell interference coordination by a fixed evolved node B (eNB) in a wireless communication system, the method comprising:
receiving channel state information-reference signal (CSI-RS) configurations on access links of individual moving cells connected to the fixed eNB;
determining a CSI-RS configuration on a backhaul link of a first moving cell among the moving cells based on the CSI-RS configurations on the access links; and
transmitting the determined CSI-RS configuration on the backhaul link to the first moving cell;
wherein the determined CSI-RS configuration on the backhaul link is to measure interference caused to the backhaul link of the first moving cell by an access link of a second moving cell among the moving cells.

2. The method of claim 1, wherein the CSI-RS configuration on the backhaul link corresponds to moving cell-specific information and wherein the CSI-RS configurations on the access links correspond to UE-specific information.

3. The method of claim 1, wherein determining the CSI-RS configuration on the backhaul link comprises:
nulling a moving cell-specific CSI-RS, which is transmitted through the backhaul link of the first moving cell, in resource elements where a UE-specific CSI-RS is transmitted according to a CSI-RS configuration on the access link of the second moving cell.

4. The method of claim 1, further comprising:
receiving a channel state report including information on the interference caused to the backhaul link of the first moving cell by the access link of the second moving cell.

5. The method of claim 4, wherein a transmission periodicity of the channel state report is determined by considering at least one of mobility of the first moving cell and mobility of the second moving cell.

6. The method of claim 4, wherein the information on the interference caused by the access link of the second moving cell includes information on a received power of a UE-specific CSI-RS, which is transmitted according to a CSI-RS configuration on the access link of the second moving cell, at the first moving cell and information on a reception timing of the UE-specific CSI-RS at the first moving cell.

7. The method of claim 1, further comprising:
requesting scheduling information of the access link of the second moving cell according to the interference caused to the backhaul link of the first moving cell by the access link of the second moving cell;
receiving the scheduling information of the access link of the second moving cell; and
performing interference coordination between the backhaul link of the first moving cell and the access link of the second moving cell based on the scheduling information of the access link of the second moving cell.

8. The method of claim 7, wherein performing the interference coordination comprises setting at least one parameter in a subframe configuration of the backhaul link of the first moving cell to be different from that in a subframe configuration of the access link of the second moving cell.

9. The method of claim 7, wherein performing interference coordination comprises setting a beam direction for the backhaul link of the first moving cell to be different from that for the access link of the second moving cell.

10. A method for measuring interference from a second moving cell by a first moving cell connected to a fixed evolved node B (eNB) in a wireless communication system, the method comprising:
transmitting, to the fixed eNB, a channel state information-reference signal (CSI-RS) configuration on an access link of the first moving cell;
receiving, from the fixed eNB, a CSI-RS configuration on a backhaul link of the first moving cell; and
measuring interference caused to the backhaul link of the first moving cell by an access link of the second moving cell based on the CSI-RS configuration on the backhaul link of the first moving cell,
wherein the CSI-RS configuration on the backhaul link of the first moving cell is determined based on CSI-RS configurations on access links of a plurality of individual moving cells including the first and second moving cells.

11. The method of claim 10, wherein the CSI-RS configuration on the backhaul link corresponds to moving cell-specific information and wherein the CSI-RS configurations on the access links correspond to UE-specific information.

12. The method of claim 10, wherein the CSI-RS configuration on the backhaul link is obtained by nulling a moving cell-specific CSI-RS, which is transmitted through the backhaul link of the first moving cell, in resource elements where a UE-specific CSI-RS is transmitted according to a CSI-RS configuration on the access link of the second moving cell.

13. The method of claim 10, further comprising:
transmitting a channel state report including information on the interference caused to the backhaul link of the first moving cell by the access link of the second moving cell.

14. The method of claim 13, wherein a transmission periodicity of the channel state report is determined by considering at least one of mobility of the first moving cell and mobility of the second moving cell.

15. The method of claim 13, wherein the information on the interference caused by the access link of the second moving cell includes information on a received power of a UE-specific CSI-RS, which is transmitted according to a CSI-RS configuration on the access link of the second moving cell, at the first moving cell and information on a reception timing of the UE-specific CSI-RS at the first moving cell.

16. A fixed evolved node B (eNB) for performing inter-cell interference coordination in a wireless communication system, the eNB comprising:
a receiver configured to receive channel state information-reference signal (CSI-RS) configurations on access links of individual moving cells connected to the fixed eNB;
a processor configured to determine a CSI-RS configuration on a backhaul link of a first moving cell among the moving cells based on the CSI-RS configurations on the access links; and
a transmitter configured to provide the first moving cell with the determined CSI-RS configuration on the backhaul link,
wherein the determined CSI-RS configuration on the backhaul link is to measure interference caused to the backhaul link of the first moving cell by an access link of a second moving cell among the moving cells.

* * * * *